Sept. 11, 1956        C. D. VISOS        2,762,886
CONTROL THERMOSTAT UNIT FOR AN ELECTRIC HEATER
Filed Nov. 23, 1953        2 Sheets-Sheet 1
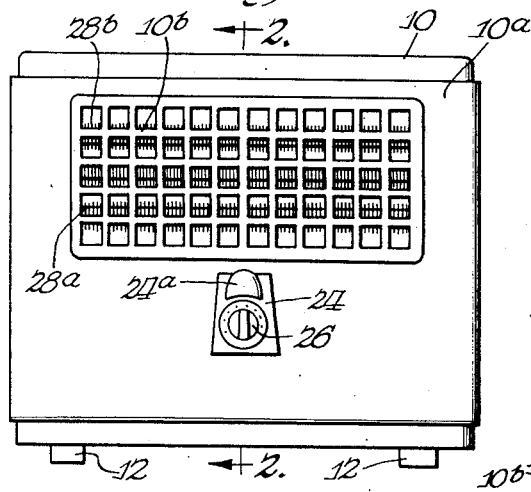
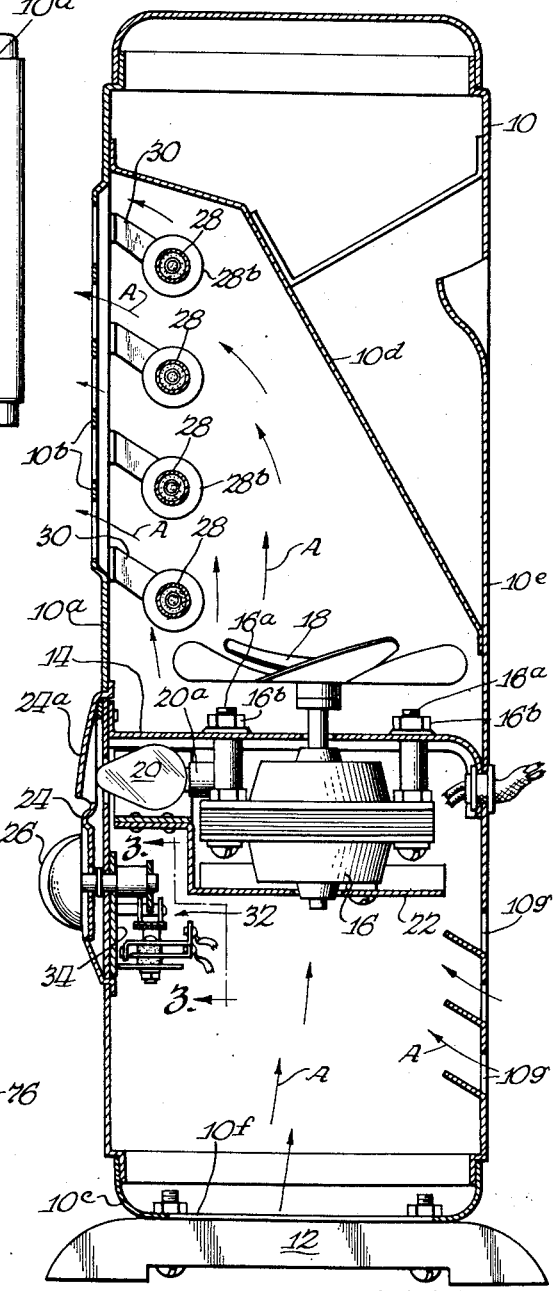
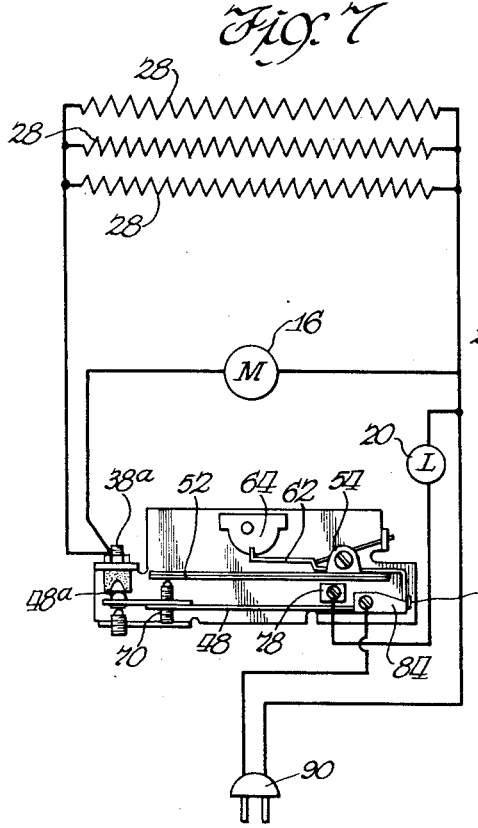
INVENTOR
CHARLES D. VISOS
BY Bair, Freeman & Molinare
ATTORNEYS

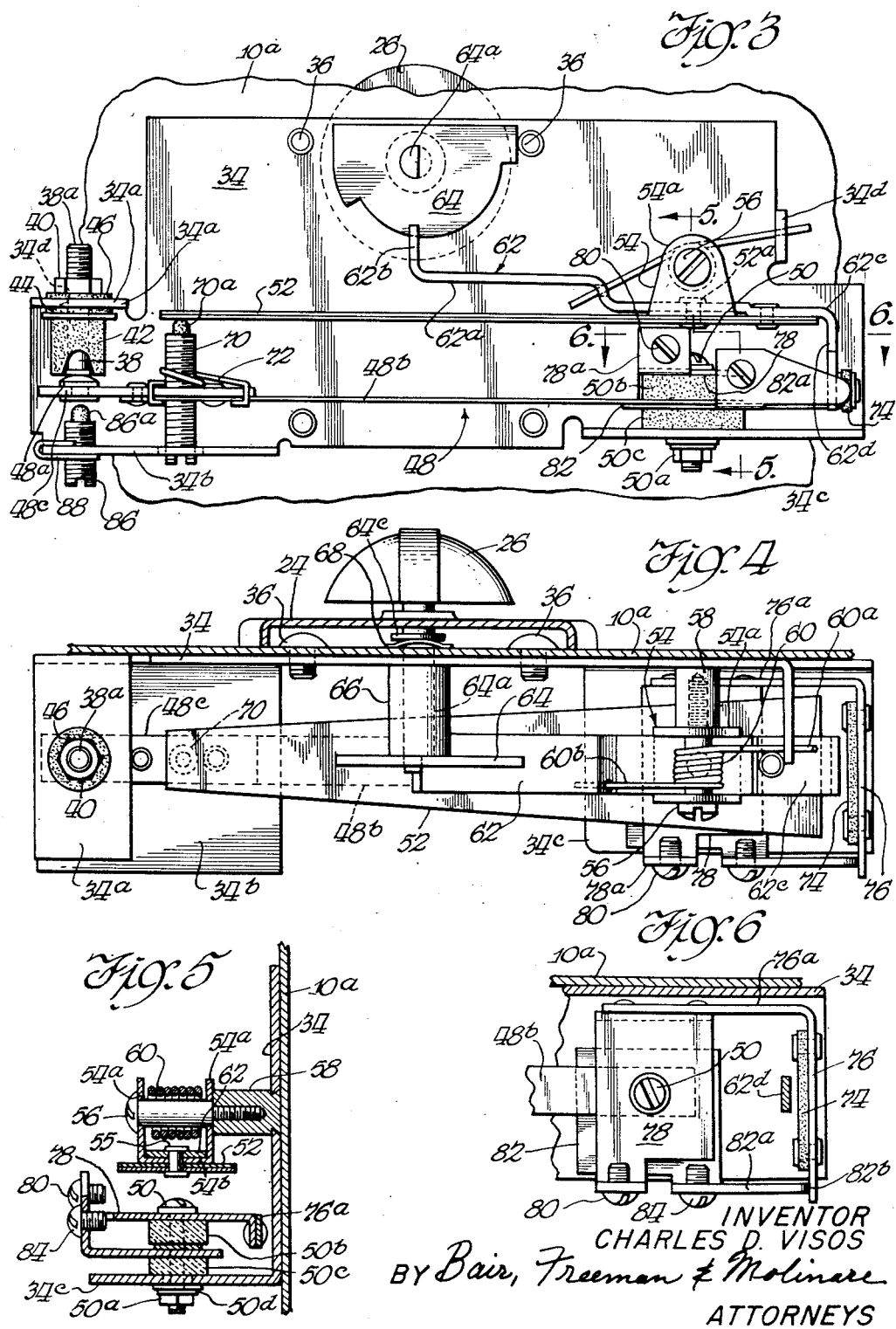

United States Patent Office 2,762,886
Patented Sept. 11, 1956

2,762,886

CONTROL THERMOSTAT UNIT FOR AN ELECTRIC HEATER

Charles D. Visos, St. Louis, Mo., assignor to Knapp-Monarch Company, St. Louis, Mo., a corporation of Delaware Application November 23, 1953, Serial No. 393,800

3 Claims. (Cl. 200—138)

The present invention relates to a control thermostat unit for an electric heater, the unit being characterized by simple and inexpensive construction, ability to regulate accurately the room temperature, adjustability to desired calibration and dead band, and suitablility for use with an off-on indicator lamp without the necessity of an additional off-on control switch.

In one type of electric room heater, the housing is provided with a screened front face behind which are located finned electric heating elements. A fan is provided to blow air upwardly and through these elements out to the room, suitable air passages being provided in the heater for this purpose. In mechanisms of this type it is desirable to regulate the energization of the heating elements in accord with the room air temperature. It is also desirable in the interest of convenience and safety to provide an indicator light operable to show whether the heater is on or off.

Additionally, it is desirable in room heaters of the above type to provide a simple adjusting mechanism operable both to regulate the value of the regulated room temperature and operable as an on-off switch when turned to the extreme low temperature position.

It is, therefore, a general object of the present invention to provide an improved temperature control unit for an electric heater characterized by simple and inexpensive construction and reliable operation.

Further objects of the present invention are to provide an improved temperature control unit for an electric heater that is suitable for use with an off-on indicator lamp, can be readily adjusted to desired temperature in a regulated range, has means to calibrate the control and to adjust the temperature dead band, and can be turned on and off by manipulation of the temperature control itself.

The novel features which I believe to be characteristic of my invention are set forth with particularity in the appended claims. My invention, itself, however, both as to its organization and method of operation, together with further objects and advantages thereof, will best be understood with reference to the following description taken in connection with the accompanying drawings, in which:

Figure 1 is a front elevational view of an electric heater using the control mechanism of the present invention;

Figure 2 is an enlarged cross-sectional view through axis 2—2, Figure 1;

Figure 3 is a cross-sectional view through axis 3—3, Figure 2, drawn to a still larger scale;

Figure 4 is a top plan view of the apparatus of Figure 3;

Figure 5 is a fragmentary, cross-sectional view through axis 5—5, Figure 3;

Figure 6 is a fragmentary, cross-sectional view through axis 6—6, Figure 3; and

Figure 7 is a partially schematic and partially diagrammatic circuit diagram of the complete heater.

Referring now to Figures 1 and 2, the heater consists of a sheet metal housing 10, having a front 10a with an apertured or screen portion 10b, through which air can be discharged, as shown by the arrows A, Figure 2.

The housing 10 is supported by spaced feet 12 to which the base plate 10c of the housing is bolted, as shown in Figure 2. The housing also has a tilted baffle 10d, which is made of material having good reflectance to perform the dual function of guiding the air and reflecting radiant heat through the screen 10b out into the room.

A horizontal bracket 14 extends from the front panel 10a of the housing to the rear panel 10e, as shown in Figure 2. This bracket is affixed to these panels by any suitable means. It carries the fan motor 16, to which it is attached by the bolts 16a and nuts 16b. The motor 16 drives fan blades 18, which rotate to impel air flow upwardly against the baffle 10d and out the screened portion 10b of the front 10a. The base portion of the housing 10 is apertured at 10f and the back wall 10e is apertured at 10g. These openings provide air intake openings so that the fan 18 drives the air through the unit as indicated by the arrows A. An indicator light 20 is mounted in a suitable socket 20a carried by the bracket 22 suspended from the motor 16. This light registers with a decorative hood 24a, defined by the plate 24 located in the front wall 10a of the heater. The light 20 shines downwardly against the control knob 26, thereby not only indicating the fact that the heater is operating but also facilitating a reading of the regulated temperature.

The heater elements are indicated at 28 and consist of elongated tubes 28a, Figure 1, about which are spirally wrapped the fins 28b, the latter being of copper, aluminum, steel, or similar material having good heat conductivity. The heaters 28 are carried from the front wall 10a by the support brackets 30. The temperature control unit proper is indicated generally at 32, Figure 2. This unit consists of a bracket 34, which is seen in detail in Figures 3 and 4. This bracket is mounted vertically on the front wall 10a by the screws 36, Figure 4, each of which is received in a threaded opening in the bracket 34 and extends through the front wall 10a to secure these parts together. The bracket 34 has a pair of complementary, horizontally extending ears 34a and 34b, the former being located directly above the latter, as shown in Figures 3 and 4. A third horizontal bracket 34c is likewise formed on the support bracket 34. The ear 34a receives the contact button 38. This contact button has a threaded shank 38a, which threadedly receives the nut 40. A permanent magnet 42 extends around the button 38 as a sleeve and seats at its upper edge against the insulating washer 44. A similar insulating washer 46 is positioned on the opposite side of the ear 34a. The ear 34a has an opening 34d larger in diameter than the button shank 38a so that the contact button 38 is held in electrically insulated relationship to the ear 34a and hence the housing of the heater.

A flexible blade 48 has a contact-making button 48a which cooperates with the contact button 38 to establish a circuit when the blade 48 is in the unflexed condition. The blade 48 is of two-part construction, having a flexible base part 48b and a non-flexible magnetic end part 48c, which carries the contact button 48a. The flexible blade 48 is insulatingly carried from the ear 34c by the bolt 50 and nut 50a. The blade 48 is sandwiched between the insulating blocks 50b and 50c and has an opening to receive the bolt 50 which is of greater diameter than bolt 50, thereby supporting the blade 48 without an electrical connection to ear 34c.

The blade 48 is actuated by the bimetal blade 52 which is of tapering conformation, as shown in Figure 4. The bimetal blade 52 is affixed by the rivet 52a to the base portion of the rockable stirrup 54. This stirrup has a pair of upwardly extending ears 54a which receive the bolt 56 which is threadedly secured to the support cylinder 58. The latter is received in a conical opening in the bracket 34 and is peened over to form a tight rivet-like engagement, as shown in Figure 5. The base portion of the stirrup is shown at 54b, and the rivet affixing the bimetal 52 to that portion of the stirrup is indicated at 55, Figure 5. A spiral spring 60 is wrapped about the bolt 56 and at its ends 60a and 60b extends through openings in the ear 34d of the bracket 34 and in the arm 62, respectively, as shown in Figures 3 and 4. This spring biases the bimetal blade 52 in the clockwise direction, as seen in Figure 3.

The arm 62 is sandwiched between the rivet 55 and the base 54b of the stirrup 54, as shown in Figures 3 and 5. This arm extends above the blade 52 in the region 62a and then is bent vertically upwardly at 62b, where it has a slotted end in which the cam 64 rides. The cam 64 is carried by shaft 64a, which extends through bracket 34 and the panel 24 and receives the temperature control knob 26 at its forward free end. The shaft 64a is held in horizontal position by the cylinder 66, which is snugly received in a tight friction fit in the bracket 34. The cam 64 is held snugly against the end face of the cylinder 66 by the spring 68, which bears against the axially immovable washer 64c.

The screw 70 is threadedly received in the end part 48c of the blade 48, as shown in Figure 3. This screw is in registry with the blade 52 and has an insulating tip 70a, against which the end of the bimetal 52 bears as temperature rises. A spring 72 is wrapped about the screw 70 and is anchored to blade 48 to act as a lock washer and prevent rotation of screw 70 under vibration.

The arm 62 extends rearwardly at 62c and downwardly at 62d, as shown in Figure 3. This downwardly extending portion bears against panel 74 of fibre or other insulating material which is, in turn, riveted to the flexible spring member 76. The latter is riveted at portion 76a to the rear face of the bracket 78 which, as shown in Figures 3, 4, and 5, is sandwiched between the bolt 50 and the insulating block 50b. Also, as shown in these figures, the bracket 78 has an upturned ear 78a, which receives screw 80 to form a connecting terminal for the unit.

The bracket 82 is sandwiched between the lower insulating block 50c and the blade 48. As shown, the bracket 82 has an upwardly extending ear 82a, which extends rearwardly to juxtaposition with the flexible arm 76, as shown in Figure 6, and indicated at 82b. The ear portion 82a of bracket 82 receives a bolt 84 to form a connector to receive a wire. The bolt 50 and nut 50a are insulated from the bracket 34 by reason of the insulating washer 50d and the fact that the bracket 34c has an opening larger in size than the bolt 50.

The screw 86, Figure 3, is received in the ear 34b of bracket 34 and extends upwardly to be engaged by the contact button 48a. Screw 86 has an insulating head 86a against which the button 48a seats. A U-shaped spring 88 prevents rotation of the screw 86 under vibration.

As shown in Figure 7, the heater elements 28 and the motor 16 are connected across the appliance plug 90 through the circuit which can be traced from the left-hand contact of plug 90 to bracket 84, through blade 48, contact button 48a and bolt 38a to the heater elements and motor, respectively. The opposite terminals of the heater elements and motor are connected to the right-hand prong of the appliance plug 90, as shown. Thus, the motor 16 and the heater elements 28 are simultaneously energized when the blade 48 is in contact-making position with respect to the fixed contact 38. However, as the temperature of the air passing through the heater increases, the bimetal blade 52 flexes downwardly to engage the screw 70 and thereby flex the arm 48 to non-contacting position. The temperature at which the non-contacting position occurs is determined by the orientation of the stirrup 54, which position is, in turn, determined by the particular point on cam 64 in engagement with the arm 62.

The indicator lamp 20 is energized from the circuit which can be traced from the left-hand prong of plug 90 through bracket 84, through the flexible arm 76, and thence to the bracket 78, to one terminal of the lamp 20. The other terminal of lamp 20 is connected directly to the right-hand prong of appliance plug 90, as shown in Figure 7. Since the flexible arm 76 is moved to non-contacting position in relation to the fixed bracket 84 when the cam 64 is turned to the full clockwise position, as seen in Figure 3, the lamp 20 is energized as long as the plug 90 is plugged in unless the cam is turned to this extreme position.

The surface of the cam 64 is radially tapered and has its maximum radius when turned to a maximum position in the clockwise direction of Figure 3. This position of maximum clockwise rotation corresponds to the minimum regulated temperature, since the bimetal blade 52 separates the contacts 48a—38 at lowest temperature when this condition occurs. On the other hand, when the cam 64 and knob 26 are turned in the counter-clockwise direction of Figure 3, the value of the regulated temperature is increased, since at this time the blade 52 must flex to a greater extent to break the contact 48a—38.

Preferably, the knob 26 and the plate 24 have suitable indicia to indicate the value of the regulated temperature. The unit can be calibrated to assure the attainment of the indicated regulated temperature by adjustment of the screw 70, which varies the degree of flexure of bimetal 62 to separate contacts 48a—38 at any position of the cam 64.

The screw 86 fixes the extent of spacing between the end 48c of blade 48 and the magnet 42 when the blade 48 is in non-contacting position. Since this screw can be adjusted to control the extent the portion 48c of blade 48 is in the field of magnet 42 when non-contacting, the screw 86 determines the force exerted by bimetal 52 when the blade 48 snaps back to contact making position. This movement occurs when the attraction of the magnet 42 equals the force of the bimetal 52. Thus adjustment of the screw 86 controls the temperature difference between the contact-making and contact breaking positions of the arm 48 and thereby controls the dead-band of the control unit.

It will be observed from the foregoing that the unit 32 of the present invention is simple in construction and inherently reliable in operation. Moreover, it is unnecessary to provide an on-off switch, since the knob 26 can be merely set over to the extreme low temperature position to assure that the heater will not be energized. Additionally, in this position, the lamp 20 is de-energized, all without special switch mechanism for this purpose. Since the unit 32 is exposed to the air coming into the heater and, in addition, none of the temperature-sensitive parts (specifically bimetal 52) are current carrying parts, there is no tendency for heating in the control unit which might otherwise give false operation.

While I have shown and described a specific embodiment of the present invention, it will, of course, be understood that various modifications and alternative constructions may be made without departing from the true spirit and scope thereof. I, therefore, intend by the appended claims to cover all modifications and alternative constructions falling within their true spirit and scope.

What I claim as new and desire to secure by Letters Patent of the United States is:

1. A control thermostat unit for an electric heater, the unit comprising: an electrical contact button; a conducting blade adapted to be in electrical contact with a current supply and cooperable with the button to establish contact therewith; a support member insulatingly supporting the blade for flexure to contact-making and contact-breaking positions; a bimetal blade; means rockably supporting said bimetal blade for engagement with the first blade to flex the same to contact-breaking position as temperature rises; a pair of arms affixed to said bimetal blade; a cam rotatably supported by said support member and having a cam surface in engagement with one of said arms to rock the bimetal blade adjustably as the cam is rotated to provide positions of regulated temperature varying from a low temperature value to a high temperature value, the other of said arms serving to disengage a pair of normally closed electrical contacts located between said first blade and the current supply when the cam is rotated to the extreme low temperature position.

2. A control thermostat unit for an electric heater, the unit comprising: an electrical contact button; a conducting blade adapted to be in electrical contact with a current supply and cooperable with the button to establish contact therewith; a support member insulatingly supporting the blade for flexure to contact-making and contact-breaking positions; a bimetal blade; means rockably supporting said bimetal blade for engagement with the first blade to flex the same to contact-breaking position as temperature rises; a pair of arms affixed to said bimetal blade; a cam rotatably supported by said support member and having a cam surface in engagement with one of said arms to rock the bimetal blade adjustably as the cam is rotated to provide positions of regulated temperature varying from a low temperature value to a high temperature value, the other of said arms serving to disengage a pair of normally closed electrical contacts located between said first blade and the current supply when the cam is rotated to the extreme low temperature position, said last named contacts being defined by a pair of normally engaged contact brackets supported by said support member, one of said brackets being insulatingly separated from said first blade and the other bracket being in electrical contact with said first blade, said other of said pair of arms being operable to move one of said brackets relative to the other to effect disengagement of said contacts.

3. A control thermostat unit for an electric heater adapted to be mounted in the air stream produced by the heater, the unit comprising: a support plate adapted to be mounted vertically in the heater and having a pair of horizontally extending complementary ears; an electrical contact button insulatingly supported by one ear; an insulated adjusting screw mounted in the other ear in registry with the contact button; a flexible blade insulatingly carried by the support plate and cooperable with the contact button to establish electrical contact therewith, said flexible blade being adapted to be in electrical contact with a current supply; a bimetal blade rockably carried by the plate; an adjustable screw extending between the blades to force the first blade to a contact-breaking position with respect to the contact button as temperature rises; a cam rotatably carried by the support plate; an arm extending from the cam to the bimetal blade to rock the same in relation to the support plate and adjust the temperature at which the first blade moves to contact-breaking relation between a low temperature value and a high temperature value; a second arm attached to the bimetal blade; and means supported by the mounting plate for defining electrical contacts between said first blade and the current supply, said means comprising a first contact bracket insulatingly separated from said first blade and a second contact bracket in electrical contact with said first blade, said brackets normally being in electrical contact with each other, said second arm attached to the bimetal blade being operable to move one of said brackets to disengage said contacts when the cam is rotated to the extreme low position.

References Cited in the file of this patent

UNITED STATES PATENTS

| 2,518,595 | Bletz | Aug. 15, 1950 |
| 2,598,556 | Judson | May 27, 1952 |
| 2,619,578 | Jepson et al. | Nov. 25, 1952 |